United States Patent [19]

Apice et al.

[11] Patent Number: 4,472,462
[45] Date of Patent: Sep. 18, 1984

[54] PAINT APPLYING METHOD USING MARKING DEVICE

[75] Inventors: Pasquale J. Apice, Cresskill, N.J.; Sidney D. Barlow, Scarsdale, N.Y.

[73] Assignee: Mark-Tex Corporation, Englewood, N.J.

[21] Appl. No.: 464,160

[22] Filed: Feb. 7, 1983

Related U.S. Application Data

[63] Continuation of Ser. No. 256,065, Apr. 21, 1981, abandoned.

[51] Int. Cl.³ .......................... B05D 5/00; B05D 7/24
[52] U.S. Cl. .......................... 427/288; 260/DIG. 38; 401/188 A; 523/161
[58] Field of Search .................... 427/288; 106/23, 30, 106/20, 27, 28; 401/188 A; 260/DIG. 38; 428/196; 523/161

[56] References Cited

U.S. PATENT DOCUMENTS

| 2,107,424 | 2/1938 | Platt | 401/214 |
| 2,787,249 | 4/1957 | Barlow et al. | 401/188 A |
| 3,244,558 | 4/1966 | Chan | 106/23 X |
| 3,425,779 | 2/1969 | Fisher et al. | 106/23 X |
| 3,823,020 | 7/1974 | Gilson et al. | 106/23 X |
| 3,825,431 | 7/1974 | Uhl et al. | 106/23 X |
| 3,854,826 | 12/1974 | Adams | 401/188 A |
| 3,950,290 | 4/1976 | Drury, Jr. et al. | 427/288 X |
| 4,195,941 | 4/1980 | Barlow | 401/214 |

FOREIGN PATENT DOCUMENTS

146947  6/1950  Australia .............................. 106/28

Primary Examiner—Evan K. Lawrence
Attorney, Agent, or Firm—Eliot S. Gerber

[57] ABSTRACT

A method of applying fluid paint utilizes a marking device having a fluid paint-filled reservoir, a tip comprising a spring-loaded ball and its spring, and pressure means, such as collapsible walls or a pressure device, to apply pressure to the fluid. The paint, applied to a fabric as a decoration, is an oil-in-water emulsion in which oil mixture droplets (globules) are evenly dispersed in the water phase. The oil droplets are composed of an oil mixture preferably based on an oil-modified polyurethane or oil-modified alkyd or other oil-modified resin and drying agents. The oil-in-water emulsion contains a surfactant, a gellant, and an anti-foam agent. The pigment dispersion may be in the oil droplets or in the water phase.

6 Claims, 1 Drawing Figure

000
PAINT APPLYING METHOD USING MARKING DEVICE

This is a continuation of application Ser. No. 256,065 filed Apr. 21, 1981 and entitled "Marking Device Paint System", abandoned.

BACKGROUND OF THE INVENTION

At the present time the painting or decorating of a woven or non-woven fabric sheet using a marking device is a widespread and popular home hobby. For example, a lightweight cloth fabric is stretched on a hoop assembly. The fabric is painted upon using a ball point marking device having a colored fluid paint. The fabric sheet may have a pattern printed on its surface outlining the areas to be colored by the various colored marking devices.

The ball point marking device comprises a tip holding, at its end, a metal ball and a coil spring loading the ball. The tip is connected to a paint reservoir, which may be a solid or a collapsible tube. The paint is much thicker than fountain pen ink and is placed under pressure, for example, by squeezing the collapsible tube or by a rubber-like bulb which, when compressed, forces air into the tube. The paint consists of pigment dispersed in a mineral spirit vehicle.

There are a number of problems with the presently available marking device paint dispensing systems. The fluid paint may separate in the tube before it is used. If the paint becomes separated, part of the paint may be thin, so that it spreads and ruins the fabric and, in addition, the paint will not provide a uniform color. The marking devices, consequently, have a limited "shelf-life", i.e., the paint in such devices will separate within a few years. Consequently, it may happen that the seller of the marking devices may, inadvertently, sell tubes with separated paint to his customers, since such tubes with separated paint are not distinguishable in appearance from fresh tubes; the users may find they have to replace one or more colors before using the contents of the tube since the remaining paint may have separated; and the manufacturer of the marking devices may be plagued with returned devices and dissatisfied customers. In addition, the paint may dry or separate at the tip, i.e., at the ball, causing the ball to jam or stick.

The paint, since it is based on mineral spirits, has a distinctive odor and has become increasingly expensive. In addition, over time, the pigment may partially settle so that the paint is less pigmented when use is started and more heavily pigmented after using the marking device for a time, providing uneven color. The paint is relatively messy, hard to remove from fingers and, in a few cases, may be mistaken for food by very young children and eaten.

One type of house paint, using water as its base, is called an "emulsion" paint. However, such paint is not an emulsion in the sense of globules, one fluid phase dispersed into another fluid phase, but rather consists of solid resin particles dispersed in a water base.

OBJECTIVES OF THE INVENTION

It is an objective of the present invention to provide a marking method of applying fluid paint with a marking device paint system utilizing a spring-loaded ball marking device in which the paint, for many years, will not separate, dry out and clog the ball or otherwise cause the marking device to be useless.

It is a further objective of the present invention to provide such a marking method in which the paint colors, after application to cloth and drying, will be fast to ordinary washing and dry cleaning.

It is a further objective of the present invention to provide such a marking method in which the paint will be close to the same color immediately on application to fabric while still wet as after air drying.

It is a further objective of the present invention to provide such a marking method in which the paint will not be "flammable" in the sense that it will not burst into flames when touched with a match flame, or spark, either in the marking device or in the event of rupture of the device.

It is a further objective of the present invention to provide such a marking method in which the paint will not give off harmful or objectionable odors, either wet or dry, and will not otherwise be harmful to the health of the users.

It is a still further objective of the present invention to provide such a marking method in which the paint may be thinned with water and may easily be removed from the user's fingers using soap and water.

In accordance with the present invention, the method of applying a fluid paint utilizes a marking device system in which a tip comprising a spring-loaded ball and its spring is connected to a fluid paint reservoir which may be pressurized. For example, air pressure may be applied by means of compressing a rubber-like resilient bulb having a closable inlet, the bulb being connected to a one-way air valve.

The paint, which is adapted to be applied to a fabric as a decoration, is an oil-in-water emulsion in which oil mixture droplets (globules) are evenly dispersed in the water phase. In contrast, "latex", "vinyl" or other water-based paint systems, although they may be called "emulsion" systems, comprises solid resin particles in water. Since the carrier is water, the paint is not flammable and has a reduced odor, compared to oil-based paints. The oil mixture preferably is based upon an oil-modified polyurethane or oil-modified alkyd, or other oil-modified resins. The oil mixture also contains drying agents such as a non-lead metal based drying agent and may contain the color pigment. The emulsion contains a suitable surfactant as the emulsifier, a gellant to control viscosity, and an anti-foam agent. The present invention provides a paint which is dryable in air and which, after drying, is flexible so that it does not flake off the cloth and yet is relatively fast to ordinary washing using detergents and to dry cleaning.

BRIEF DESCRIPTION OF THE DRAWINGS

Other objectives and features of the present invention will be apparent from the following detailed description which should be taken in conjunction with the accompanying drawings.

In the drawings.

DETAILED DESCRIPTION OF THE INVENTION

Figure 1:
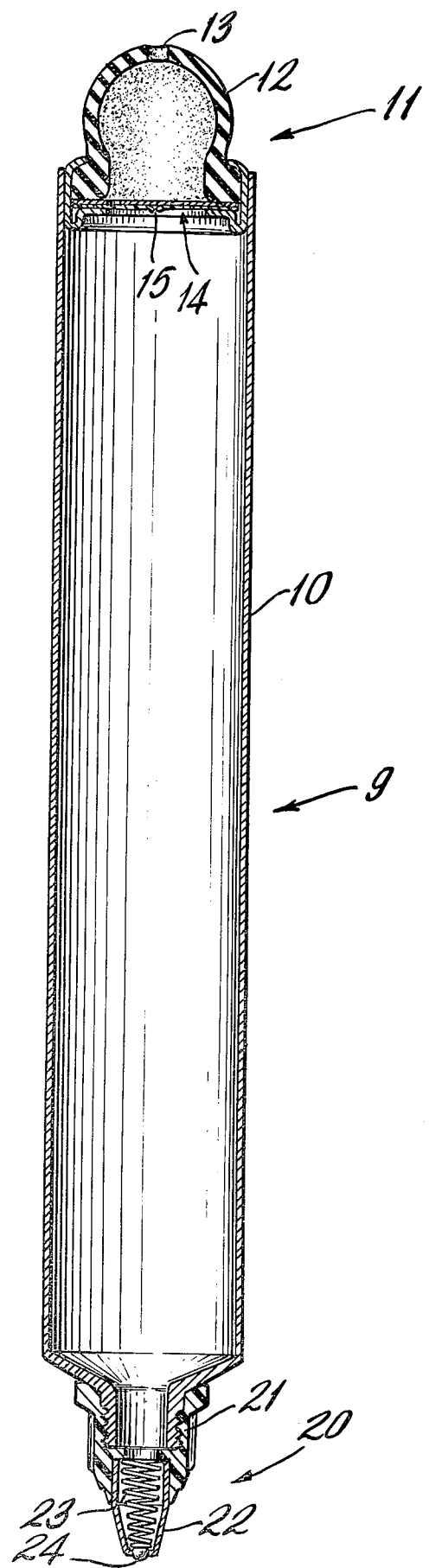
FIG. 1, the only FIGURE of the drawings, is a cross-sectional view of the marking device used in the method of the present invention.

One type of marking device suitable for use in the present invention is described in U.S. Pat. No. 2,787,248, issued Apr. 2, 1957 for "Pressurizing Means For Ink Devices" to S. D. Barlow et al, incorporated by reference herein. As therein described, an elastic bulb, "rubber bulbed member 50" has a top opening 52 for the entry of air. The bulb may be compressed, for example, by a thumb, closing the opening 52, compressing the air in the bulb and forcing it through the one-way air valve. Alternatively, other devices may be used to apply pressure to the paint; for example, the tube may be a collapsible "squeeze" tube whose tube wall may be squeezed, as in the commonly used toothpaste tubes. The fluid is held in a tube 12 having a ball point 14. The ball point is preferably a spring-loaded ball and its spring, for example, may be of the type shown in U.S. Pat. No. 4,195,941 issued Apr. 1, 1980 for "Marking Pen Writing Tip" to S. D. Barlow, and incorporated by reference herein. As shown therein, a ball 28 is compressed by a spring 27 and is used with ink at a viscosity range of 700–10,000 centipoise (Brookfield RVT instrument, 100 r.p.m.).

As shown in FIG. 1, the marking device includes a tubular reservoir 10 which contains the fluid paint. The reservoir 10 may be either flexible or rigid and, in the present embodiment as illustrated in FIG. 1, is a rigid aluminum or plastic tube. At its top end an air pressure device 11 is connected to the tubular reservoir 10. The air pressure device 11 includes an elastic and resilient bulb 12 of rubber, or rubber-like plastic resin, having a top opening 13 therethrough. The bulb is adapted to be compressed by the user's finger so that, as the finger closes the opening 13, the air within the bulb 12 will be compressed. A one-way valve mechanism 14, part of the air pressure device 11, is positioned between the bulb 12 and the tubular reservoir 10. Preferably the one-way air valve 14 comprises a flexible sheet of plastic resin having a slit 15 formed by overlapping sheets.

A tip 20, positioned at the bottom end of the tubular reservoir 10, is connected to the reservoir to control the flow of paint from the reservoir onto the cloth being decorated. The tip 20 is preferably of the type shown in the aforementioned U.S. Pat. No. 4,195,941 and comprises a top plastic resin portion 21, a bottom metal portion 22, and a coil spring 23 which spring-loads the ball 24. When pressure is placed on the ball, by applying the marking device 9 to the cloth to be decorated, the ball will be pushed upwardly against the spring 23, permitting the fluid paint within the reservoir 10 to flow around the ball. The ball, which is rotated by movement of the marking device 9 over the cloth, spreads the paint on the cloth.

The tubular reservoir 10 is filled with a fluid paint which is an oil-in-water emulsion. The oil-in-water emulsion comprises droplets of an oil mixture evenly dispersed in a water phase containing a surfactant and a gellant. The oil droplets will not become separated from the water, i.e., will not settle out, even after years of storage.

The oil mixture forms, after emulsification into water, the oil droplets in the emulsion. The oil mixture comprises a resinous vehicle, dryers, and may contain the color pigment (pigment dispersion).

The resinous vehicle is an air curable vehicle and preferably is selected from the group consisting of an oil modified alkyd and an oil-modified urethane. The preferred vehicle is an oil-modified polyurethane possessing (after drying) relatively superior resistance to washing and dry cleaning.

A suitable resinous vehicle is "Spenkel 77", a stable polyurethane vehicle comprising 50% non-volatile matter manufactured by Spencer Kellogg Co. as a reaction of diisocyanates and material containing active hydrogen atoms under its U.S. Pat. No. 2,970,062.

Another suitable resinous vehicle is "Spenkel (trademark) F48–50MS", also from Spencer Kellogg Co., which is a one-package oil-modified polyurethane, mineral spirit solvent (air pollution exempt) curable by oxidation at ambient (room) temperature.

The resinous vehicle, alternatively, suitably may be an oil oxidizing alkyd such as "Cellokyd (trademark) 4187-M" of Cellomer Corporation, Newark, New Jersey, which is a long oil (based on soya) isophthalic alkyd. Another suitable resinous vehicle, from the same company, is "Cellokyd (trademark) 2305-X", a modified oxidizing alkyd based upon mixed acids of oils and modified by phenol and rosin.

Another suitable resinous vehicle is type "501-50XV", a short oil semi-oxidizing alkyd based upon tall oil fatty acids (TOFA) and available from Thibaut & Walker Company.

The color pigment is an oil compatible dispersion. For example, a suitable white color may be formed by using titanium oxide or zinc oxide. Other color pigment dispersions conventionally used with oil-based paint formulations have also been found satisfactory.

The driers are lead-free so that the emulsion will be non-toxic. A suitable drier used with the polyurethane "Spenkel F77-60MS", mentioned above, is in the range of 0.01% to 0.03% cobalt (the percentage being based on the resin solids). An alternative metal based drier, for the same polyurethane, is 0.01%–0.03% manganese (the percentage being based on the resin solids). For example, suitable driers are available from Mooney Chemicals Inc., Cleveland, Ohio, as 6% cobalt "Ten-Cem Dryer" (trademark) produced from synthetic neodecanoic acid and 9% manganese "Neo-Nap Dryer" (trademark), a naphthenate fortified with synthetic acids.

The other materials used in the oil-in-water emulsion are added to the water phase. They are a surfactant which aids in emulsifying the oil mixture and the water and keeps the oil droplets evenly distributed, i.e., prevents settling out of the oil mixture; a gellant to help obtain the desired viscosity so that the oil-in-water emulsion flows smoothly from the ball of the marking device at the desired rate and without intermittent drops, i.e., a bodying agent; and an anti-foam agent to prevent foaming during formation of the emulsion.

Preferably the surfactant is a non-ionic surfactant which is compatible with the oil mixture, although possibly cationic or anionic surfactants may be used. A suitable surfactant has both hydrophilic (water-loving) and lipophylic (oil-loving) groups in one molecule. To form an oil-in-water emulsion, the surfactant may have a high number in the "HLB" (hydrophile-lipophile balance) scale, preferably over 10. For example, a suitable surfactant is "TWEEN 20" (trademark of Atlas Corp. for its non-electrolytic polyoxyethylene sorbitan monolaurate having an HLB number of 16.7); which is a polyoxyalkylene derivative of hexitol anhydride partial long-chain fatty acid esters. An alternative surfactant is "TRITON X:305" (trademark of Rohm & Haas Co.), a hydrophilic non-ionic alkylphenyl polyether alcohol.

A suitable gellant is added as a thixotrope for the oil-in-water emulsion to obtain the desired viscosity and to help maintain the oil droplets evenly dispersed in the water. The viscosity of the emulsion is in the range 700–10,000 and preferably in the range 1500–7000 tested by a Brookfield RTV instrument at 100 R.P.M. One suitable gellant is "Bentone LT" (trademark of NL Industries Inc. for its organoclay mineral (smectite) product). An alternative, and suitable, gellant is "Van-Gel" (trademark of R. T. Vanderbilt Company), which is a magnesium aluminum silicate. The concentration of the "Van-Gel" to the water is in the range of 1%-5% and is preferably 1%-3%.

In addition, the water preferably contains a preservative effective to inactivate any micro-organisms, a suitable preservative being "VANCIDE-TH" (trademark of R. T. Vanderbilt Co.), which is added at a level of 0.03% based upon the total weight of the gellant.

An anti-foam material is added to the water to reduce foaming. A suitable anti-foamer is "DEE-FO-97-2" (trademark of Ultra Adhesives Inc., Paterson, N.J.), which is added at a concentration of 0.05%-0.30% (total weight basis). Other silicone type anti-foam materials may also be used.

The oil-in-water emulsion is manufactured as follows: The components of the oil mixture, including the resinous vehicle and the dryers, are blended together until they are uniform. The uniform blend of the oil mixture is then added to the water phase under high agitation. The water phase, as previously described, consists of water, preservatives and surfactant, which is added to a pre-gel and stirred to a uniform thickness using just enough defoamer to control foam formation.

The pigment dispersion may be added either to the oil mixture, if it is an oil-compatible dispersion, or may be added to the water phase, if it is a water-compatible dispersion.

What is claimed is:

1. A method for applying fluid paint as a decoration on fabric comprising:

applying a fluid paint in a marking device to the fabric, the marking device having a tip including a fluid valve which is opened by pressure on the fabric and comprising a ball and a spring loading the ball, a tubular fluid paint reservoir, and means for the user to selectively apply pressure to the fluid paint within the reservoir;

the said fluid paint being non-flammable and storable for over a year in said marking device without separation and being an oil-in-water emulsion having a viscosity in the range of 1500-7000 centipoise and being held in the said reservoir; the oil phase of the emulsion containing room temperature air curable oil-modified polyurethane as its resinous vehicle and a non-lead drier; the water phase of the emulsion containing water, a surfactant and a gellant as a thixotrope to obtain the desired viscosity; and curing the paint at room temperature, in air, without heat-drying or heat-curing.

2. A method as in claim 1 wherein said tubular reservoir is a solid tubular member.

3. A method as in claim 1 wherein said means to apply pressure includes a one-way air valve and a flexible and resilient bulb having an opening therethrough.

4. A method as in claim 1 wherein the surfactant is a non-ionic surfactant which is highly hydrophilic.

5. A method as in claim 1 wherein the fluid paint further includes an oil-compatible pigment dispersion mixed into the oil phase of the emulsion and retained therein after emulsification.

6. A method as in claim 1 wherein the fluid paint further includes a water-compatible pigment dispersion mixed into the water phase of the emulsion.

* * * * *